US009849795B2

(12) United States Patent
Kato et al.

(10) Patent No.: US 9,849,795 B2
(45) Date of Patent: Dec. 26, 2017

(54) CONNECTOR ATTACHMENT STRUCTURE FOR ELECTRIC VEHICLE

(71) Applicant: HONDA MOTOR CO., LTD., Tokyo (JP)

(72) Inventors: Yasuyuki Kato, Wako (JP); Kazuo Sato, Wako (JP); Masaki Shoji, Wako (JP); Shohei Ohji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/295,301

(22) Filed: Oct. 17, 2016

(65) Prior Publication Data

US 2017/0113562 A1 Apr. 27, 2017

(30) Foreign Application Priority Data

Oct. 22, 2015 (JP) .................................. 2015-208138

(51) Int. Cl.
*H01R 33/00* (2006.01)
*B60L 11/18* (2006.01)
*H01R 13/639* (2006.01)

(52) U.S. Cl.
CPC ........ *B60L 11/1818* (2013.01); *H01R 13/639* (2013.01); *H01R 2201/26* (2013.01)

(58) Field of Classification Search
CPC .................................................. B60L 11/1818
USPC ......................................................... 439/34
See application file for complete search history.

(56) References Cited

U.S. PATENT DOCUMENTS

| 3,270,267 | A | * | 8/1966 | Nolte, Jr. .............. | H02J 7/0042 |
| | | | | | 200/51.09 |
| 3,915,476 | A | * | 10/1975 | Burkle ..................... | B60D 1/64 |
| | | | | | 280/422 |
| 6,808,413 | B2 | * | 10/2004 | Plant .................... | H01R 13/625 |
| | | | | | 439/34 |

(Continued)

FOREIGN PATENT DOCUMENTS

| JP | 09-275601 A | 10/1997 |
| JP | 2013-144520 A | 7/2013 |

(Continued)

OTHER PUBLICATIONS

Office Action dated Jun. 28, 2017, issued in counterpart Japanese Application No. 2015-208138, with English translation (6 pages).

*Primary Examiner* — Tulsidas C Patel
*Assistant Examiner* — Peter G Leigh
(74) *Attorney, Agent, or Firm* — Westerman, Hattori, Daniels & Adrian, LLP

(57) ABSTRACT

A vehicle connector that is connected through a cable to a vehicle-mounted power switchboard is attached to an attachment bracket secured to a vehicle body. The attachment bracket includes a first bracket having an attachment portion to which the vehicle connector is attached and a second bracket secured to the vehicle body so as to be positioned further to an inside of the vehicle body than the first bracket. The first bracket and the second bracket form a closed cross section. Thus, the attachment bracket having the closed cross section supports a load that is applied when a connector to be mated with the vehicle connector is inserted into or removed from the vehicle connector.

6 Claims, 5 Drawing Sheets

(56) References Cited

U.S. PATENT DOCUMENTS

| | | | | |
|---|---|---|---|---|
| 6,890,211 | B2 * | 5/2005 | Inagaki | H01R 13/748 362/492 |
| 7,338,314 | B2 * | 3/2008 | Thai | H01R 43/26 248/51 |
| 2004/0235315 | A1 * | 11/2004 | Masui | B60K 1/04 439/34 |
| 2013/0183838 | A1 * | 7/2013 | Caillot | B60S 1/3805 439/34 |
| 2013/0187449 | A1 * | 7/2013 | Mouri | B60L 11/1881 307/10.1 |
| 2014/0080024 | A1 * | 3/2014 | Igarashi | H01M 8/04529 429/437 |

FOREIGN PATENT DOCUMENTS

| | | |
|---|---|---|
| JP | 2013-151193 A | 8/2013 |
| JP | 2014-69687 A | 4/2014 |

\* cited by examiner

CONNECTOR ATTACHMENT STRUCTURE FOR ELECTRIC VEHICLE

CROSS REFERENCES TO RELATED APPLICATIONS

The present application claims priority under 35 U.S.C. §119 to Japanese Patent Application No. 2015-208138, filed Oct. 22, 2015, entitled "Connector Attachment Structure For Electric Vehicle." The contents of this application are incorporated herein by reference in their entirety.

TECHNICAL FIELD

The present disclosure relates to a connector attachment structure for an electric vehicle in which a connector connected through a cable to a vehicle-mounted power switchboard is attached to an attachment bracket secured to a vehicle body.

BACKGROUND

A known technique disclosed in Japanese Unexamined Patent Application Publication No. 2013-151193 allows a direct-current power from an energy storage mounted on a fuel cell vehicle to be converted by an external inverter into an alternating-current power so as to drive alternating-current powered external equipment by connecting an inverter connector to a vehicle connector. The vehicle connector is connected to the vehicle-mounted energy storage through a cable and attached to a bracket secured in a trunk. The inverter connector is connected to the inverter.

SUMMARY

According to the above-described related art, an attachment bracket used to attach the vehicle connector is formed of a single piece of metal plate an outer peripheral portion of which is secured to a vehicle body. The vehicle connector is fitted into an opening formed in the metal plate and secured with bolts. Thus, in view of the rigidity of the attachment bracket, the attachment bracket may be deformed when excessive load is applied by the inverter connector being inserted into or removed from the vehicle connector.

Furthermore, since the vehicle connector is provided in the trunk, it is required that a trunk lid be opened or closed in order to attach or detach the connector. Thus, attaching or detaching the connector is not a simple task.

The present application describes, for example, a technique with which the rigidity of an attachment bracket is increased. The attachment bracket supports at a vehicle body a vehicle connector connected to a power switchboard mounted on an electric vehicle.

According to an aspect of the present application, a connector attachment structure for an electric vehicle is proposed. With this connector attachment structure for an electric vehicle, a vehicle connector connected through a cable to a vehicle-mounted power switchboard is attached to an attachment bracket secured to a vehicle body. The attachment bracket includes a first bracket having an attachment portion to which the vehicle connector is attached and a second bracket secured to the vehicle body so as to be positioned further to an inside of the vehicle body than the first bracket. The first bracket and the second bracket form a closed section.

Thus, the highly rigid attachment bracket having the closed section supports a load that is applied when a connector to be mated with the vehicle connector is inserted into or removed from the vehicle connector. This can suppress deformation of the attachment bracket.

Preferably, an outer side of the attachment bracket in a vehicle width direction is secured to a wheel house outer and an inner side of the attachment bracket in the vehicle width direction is secured to a damper base.

Thus, the rigidity of the second bracket is increased by the damper base having a high strength. In addition, the torsional rigidity of a rear portion of the vehicle body is increased by integrally connecting the wheel house outer and the damper base to each other through the second bracket.

Preferably, the first bracket includes a reinforcing bead at a position adjacent to the attachment portion defined by an opening into which the vehicle connector is fitted.

Thus, reduction of the rigidity of the first bracket due to formation of the opening is compensated by the reinforcing bead. This can suppress the deformation of the first bracket due to the load applied when the connector to be mated is inserted or removed.

It is noted that an attachment hole 26b of an embodiment, for example, corresponds to the attachment portion of the present application and a wheel house outer 22 and a damper base 23a of the embodiment, for example, correspond to the vehicle body of the present application.

BRIEF DESCRIPTION OF THE DRAWINGS

The advantages of the disclosure will become apparent in the following description taken in conjunction with the following drawings.

DETAILED DESCRIPTION

An embodiment of the present application is described below with referent to FIGS. 1 to 5.

Figure 1:
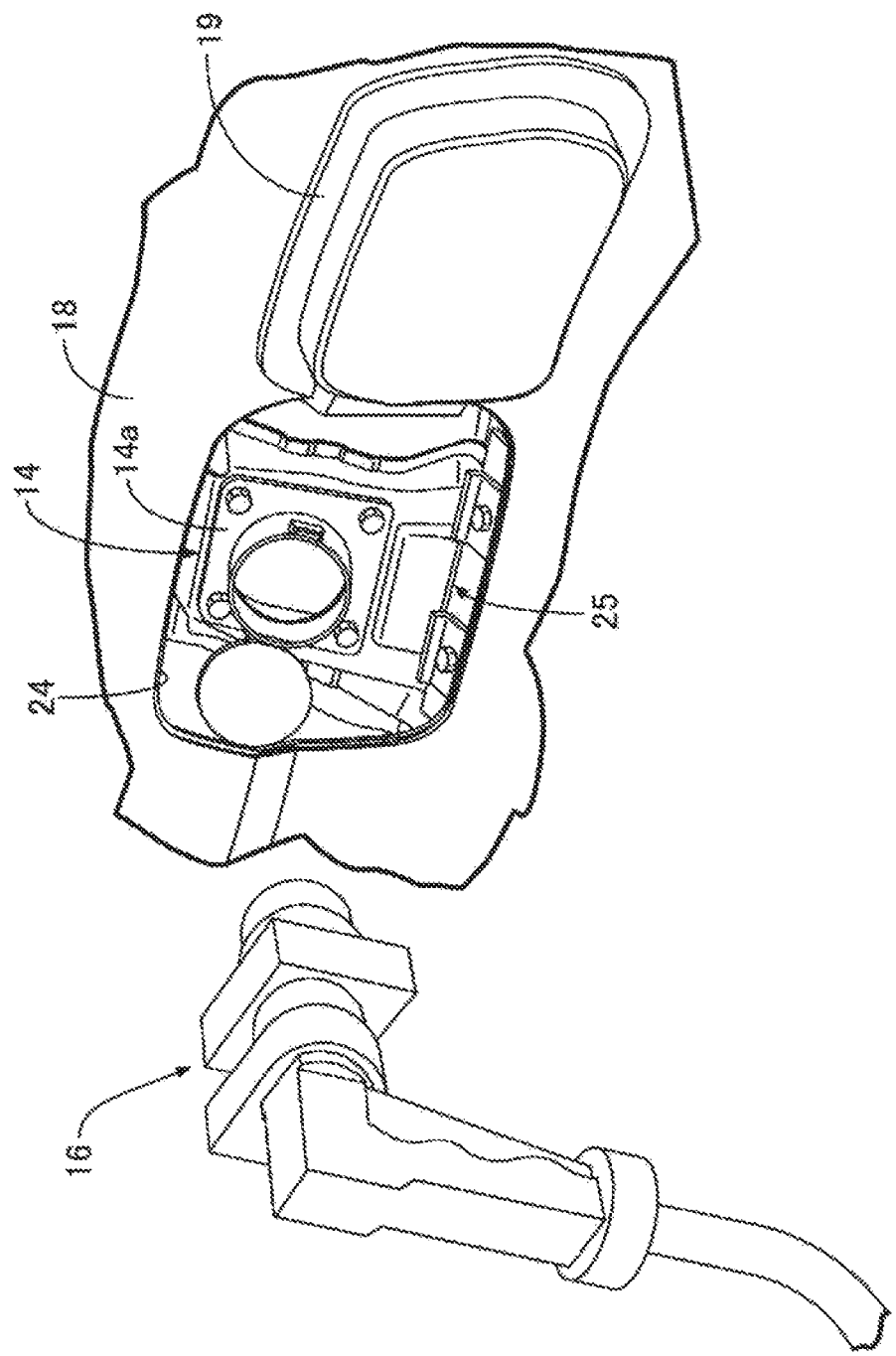
FIG. 1 illustrates an inverter connector and a vehicle connector which is provided on an inner side of a rear fender according to an embodiment.
Figure 2:
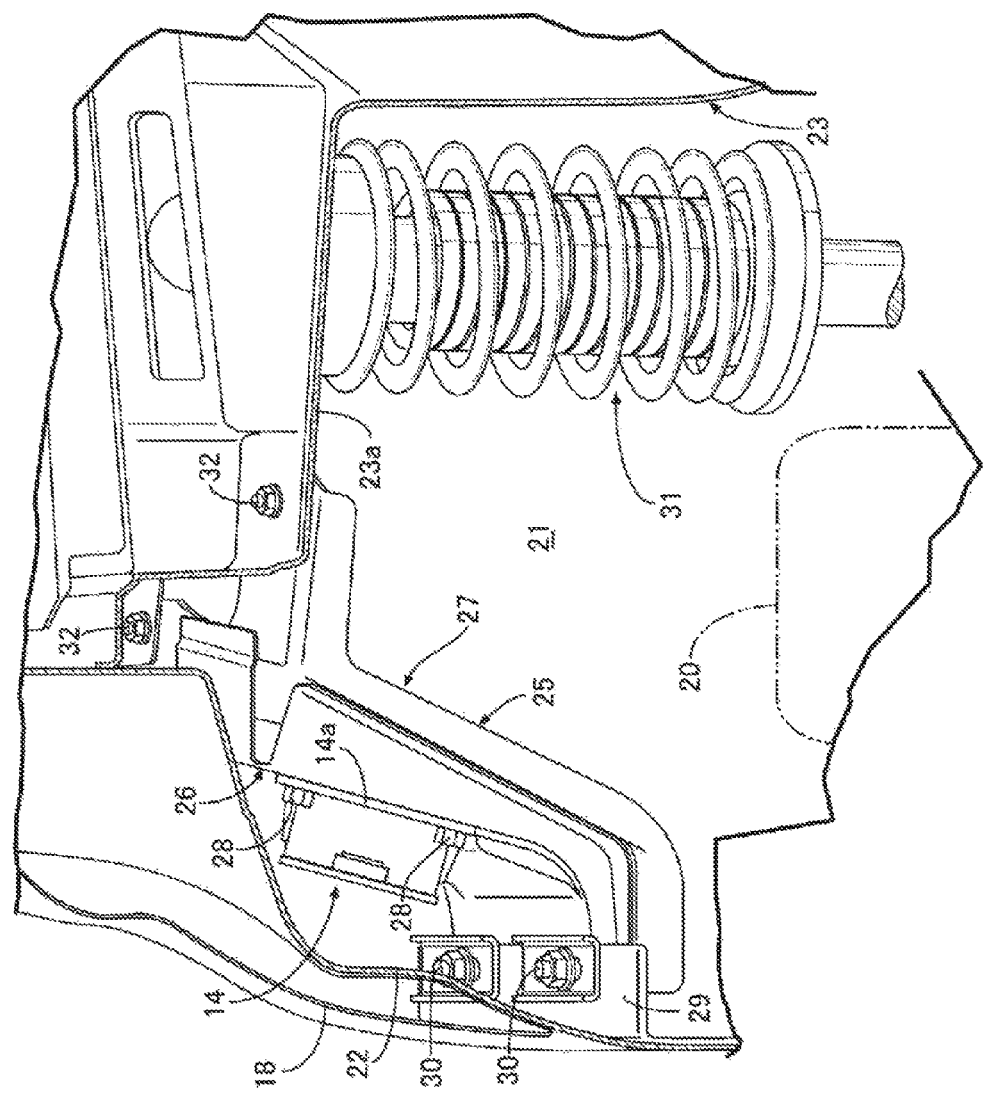
FIG. 2 is a longitudinal sectional view of a rear wheel house.
Figure 3:
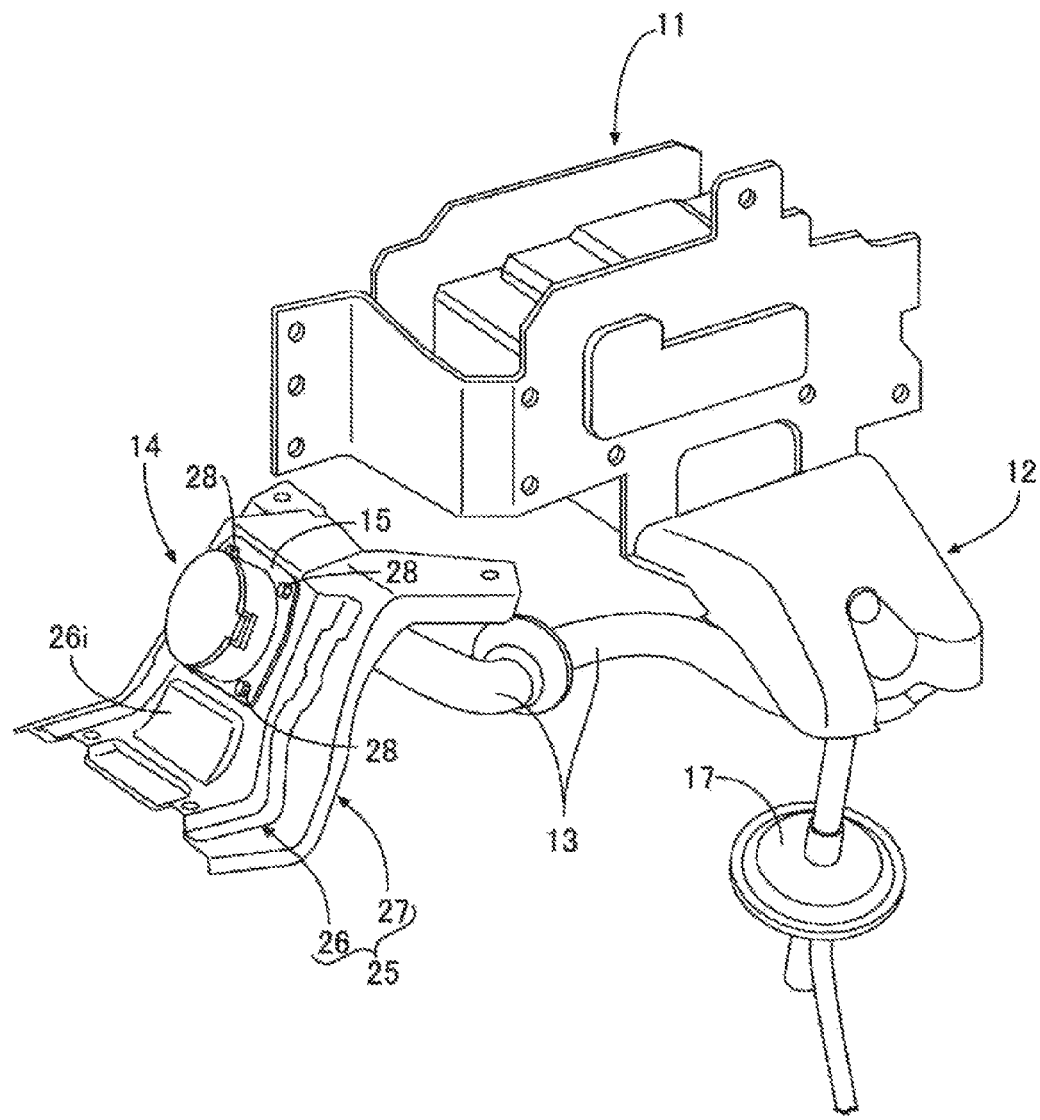
FIG. 3 is a perspective view illustrating a power switchboard, an attachment bracket, and the vehicle connector.
Figure 4:
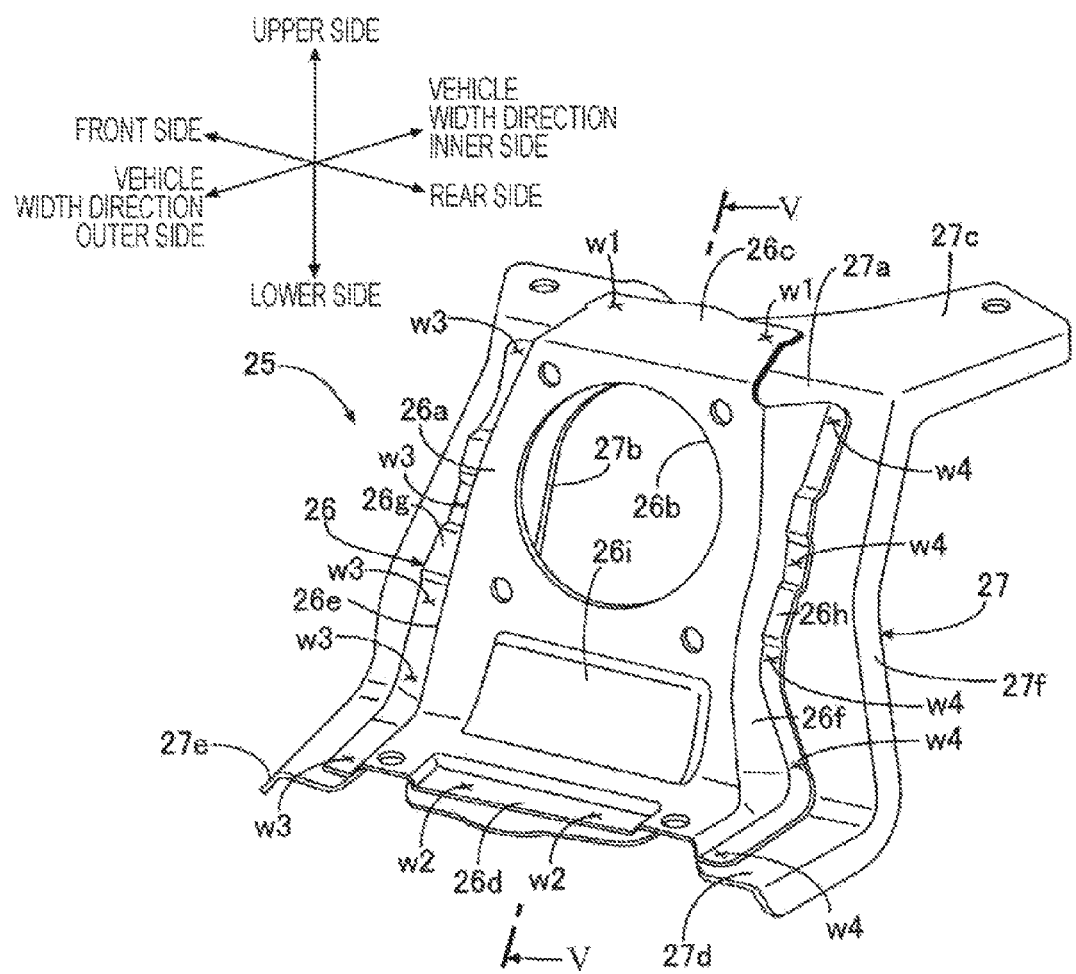
FIG. 4 is a perspective view of the attachment bracket.
Figure 5:
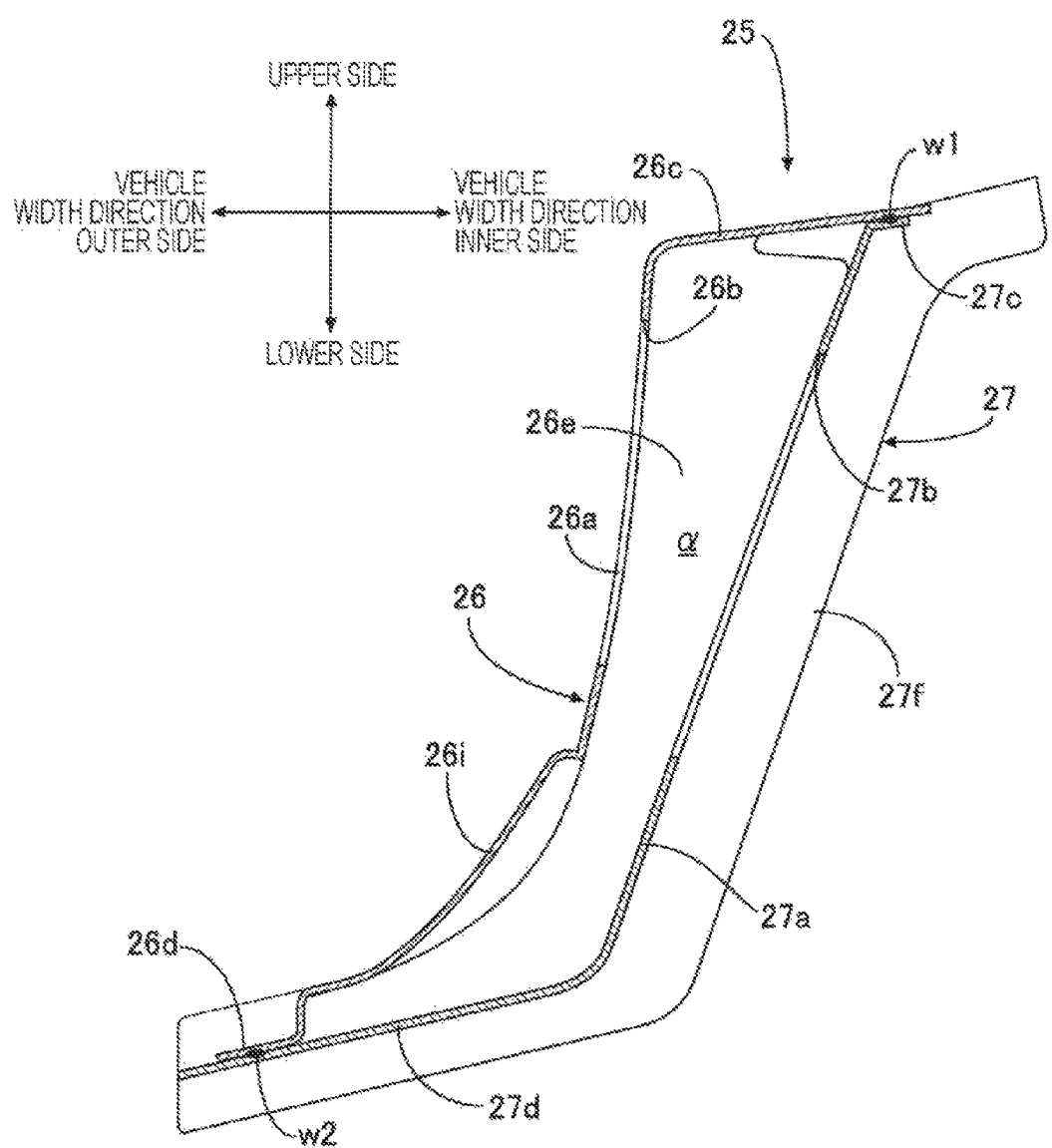
FIG. 5 is a sectional view of the attachment bracket taken along line V-V of FIG. 4.

As a kind of electric vehicle, a fuel cell vehicle is equipped with a fuel cell that generates power through an electrochemical reaction between hydrogen stored in a hydrogen tank and oxygen contained in air. The fuel cell vehicle is driven by an electric traction motor that is driven by the power generated by the fuel cell. As illustrated in FIG. 3, the electric vehicle includes a power switchboard 11. The power switchboard 11 is connected to a power source such as a lithium ion energy storage charged with part of the power generated by the fuel cell or regenerated power obtained by regeneratively braking the electric traction motor during decelerated driving.

The power supplied from the power switchboard 11 is, other than to be used to drive the electric traction motor of the fuel cell vehicle and vehicle-mounted electrical equipment, used as a power source to drive an external home appliance or the like while the electric vehicle is being parked. In order to take the power supplied from the power switchboard 11 to the outside of the vehicle, the fuel cell vehicle includes a vehicle connector 14 connected to the power switchboard 11 through a contactor 12 and a cable 13. An inverter connector 16 (see FIG. 1) connected through a cable 15 to an external inverter is coupled to the vehicle connector 14. The inverter converts direct-current power supplied from the power switchboard 11 through the contactor 12, the vehicle connector 14, and the inverter connector 16 into alternating-current power so as to drive the external home appliance or the like.

The inverter connector 16 including external terminals is manually held and handled by the user. The inverter connector 16 is connected to the vehicle connector 14, which includes internal terminals and is attached to the vehicle body, by being pressed against the vehicle connector 14 and disconnected from the vehicle connector 14 by being pulled from the vehicle connector 14. While the inverter connector 16 is disconnected from the vehicle connector 14, the contactor 12 is open, thereby electrical conduction between the power switchboard 11 and the vehicle connector 14 is broken. When the inverter connector 16 is connected to the vehicle connector 14, this connection is detected by a switch provided in the vehicle connector 14. Accordingly, the switch causes the actuator 17 to operate so as to close the contactor 12, thereby the electrical conduction between the power switchboard 11 and the vehicle connector 14 is established.

Next, an attachment structure with which the vehicle connector 14 is attached to the vehicle body is described with reference to FIGS. 1 to 5.

A lid 19 for supplying power is openably provided in a rear fender panel 18 being an outer panel of the vehicle body. A wheel house outer 22 and a wheel house inner 23 that define a rear wheel house 21 are disposed further to the center in a vehicle width direction than the rear fender panel 18. The wheel house 21 houses a rear wheel 20. The rear fender panel 18 and the wheel house outer 22 are partially superposed on each other, and an opening 24 is formed in this superposed region. The opening 24 is opened and closed by the lid 19.

An attachment bracket 25 for attachment of the vehicle connector 14 to an upper portion of the rear wheel house 21 includes two members, that is, a first bracket 26 and a second bracket 27. The first bracket 26 is formed by pressing a single metal plate and includes the following portions: a main body portion 26a having a circular attachment hole 26b in its upper portion; an upper wall 26c formed by bending inward an upper end of the main body portion 26a in the vehicle width direction; a lower wall 26d formed by smoothly curving outward a lower portion of the main body portion 26a in the vehicle width direction; a front side wall 26e formed by bending inward a front edge of the main body portion 26a in the vehicle width direction; and a rear side wall 26f formed by bending inward a rear edge of the main body portion 26a in the vehicle width direction. A front flange 26g is formed at an inner end of the front side wall 26e in the vehicle width direction by bending forward the front side wall 26e. A rear flange 26h is formed at an inner end of the rear side wall 26f in the vehicle width direction by bending rearward the rear side wall 26f. Furthermore, a reinforcing bead 26i is formed below the attachment hole 26b of the main body portion 26a. The reinforcing bead 26i projects outward in the vehicle width direction and extends to a border between the main body portion 26a and the lower wall 26d.

The second bracket 27 is formed by pressing a single metal plate and includes the following portions: a main body portion 27a having a circular relief hole 27b in its upper portion; an upper wall 27c formed by bending inward an upper end of the main body portion 27a in the vehicle width direction; a lower wall 27d formed by smoothly curving outward a lower portion of the main body portion 27a in the vehicle width direction; a front flange 27e formed by bending inward front edges of the main body portion 27a, the upper wall 27c, and the lower wall 27d in the vehicle width direction; and a rear flange 27f formed by bending inward rear edges of the main body portion 27a, the upper wall 27c, and the lower wall 27d in the vehicle width direction.

The attachment bracket 25 is assembled by integrating the first bracket 26 and the second bracket 27 with each other as follows: the upper wall 26c of the first bracket 26 is superposed on and spot welded w1 to the upper wall 27c of the second bracket 27; the lower wall 26d of the first bracket 26 is superposed on and spot welded w2 to the lower wall 27d of the second bracket 27; the front flange 26g of the first bracket 26 is superposed on and spot welded w3 to the main body portion 27a and the lower wall 27d of the second bracket 27; and the rear flange 26h of the first bracket 26 is superposed on and spot welded w4 to the main body portion 27a and the lower wall 27d of the second bracket 27.

When the attachment bracket 25 has been assembled, the first bracket 26 and the second bracket 27 form a closed section. A space $\alpha$ (see FIG. 5) is formed in the closed space. In a state in which the vehicle connector 14 is fitted into the attachment hole 26b of the first bracket 26, an attachment flange 14a of the vehicle connector 14 is attached to the main body portion 26a of the first bracket 26 with four bolts 28. At this time, part of the vehicle connector 14 on the inner side in the vehicle width direction and the cable 13 extending from the vehicle connector 14 extend to the inside of the rear wheel house 21 through the relief hole 27b of the second bracket 27.

The lower wall 26d of the first bracket 26 of the attachment bracket 25 to which the vehicle connector 14 has been attached as described above is superposed on and fastened to with two bolts 30 a lower surface of an attachment bracket 29 secured to an inner surface of the wheel house outer 22 in the vehicle width direction. Furthermore, an upper portion of the wheel house inner 23 is included in a damper base 23a that supports an upper end of a suspension damper 31 of the rear wheel 20, and the upper wall 27c of the second bracket 27 of the attachment bracket 25 is superposed on and fastened with two bolts 32 to a lower surface of the damper base 23a. As a result, the attachment bracket 25 is secured so that the attachment bracket 25 spans from the wheel house outer 22 to the damper base 23a, thereby the wheel house outer 22 and the damper base 23a are connected to each other through the attachment bracket 25.

Next, effects according to the embodiment of the present application including the above-described structure are described.

When the lid 19 provided in the rear fender panel 18 is open, the vehicle connector 14 is exposed in the opening 24. Thus, the user can insert and remove the inverter connector 16 held by his or her hand into and from the vehicle connector 14. The attachment bracket 25 that supports the vehicle connector 14 needs to have a high rigidity for safety. In this regard, the attachment bracket 25 has a high rigidity because of the structure of the attachment bracket 25 in which the first bracket 26 and the second bracket 27 are connected to each other so as to form a closed section. Accordingly, there is no concern that the inverter connector 16 is deformed by a load applied when the inverter connector 16 is inserted or removed. Furthermore, the load applied when the inverter connector 16 is inserted or removed is transmitted from the vehicle connector 14 to the wheel house outer 22 through the lower wall 26d of the first bracket 26 and also transmitted from the vehicle connector 14 to the damper base 23a through the upper wall 26c of the first bracket 26 and the upper wall 27c of the second bracket 27. Accordingly, the vehicle connector 14 itself can be prevented from shaking.

Furthermore, the rigidity of the first bracket 26 of the attachment bracket 25 is reduced due to formation of the attachment hole 26b into which the vehicle connector 14 is fitted. However, the reinforcing bead 26i, which is provided at a position adjacent to the attachment hole 26b, increases the rigidity of the first bracket 26. This can suppress the deformation of the first bracket 26 due to the load applied when the inverter connector 16 is inserted or removed.

Furthermore, with respect to the vehicle width direction, the outer side of the attachment bracket 25 is secured to the wheel house outer 22 and the inner side of the attachment bracket 25 is secured to the damper base 23a. Thus, the rigidity of the attachment bracket 25 is increased by securing the attachment bracket 25 to the damper base 23a having a high strength. In addition, the torsional rigidity of a rear portion of the vehicle body is increased by integrally connecting the wheel house outer 22 and the damper base 23a to each other through the attachment bracket 25.

Furthermore, since the vehicle connector 14 is provided in a rear fender portion of the vehicle body instead of in a trunk, the inverter connector 16 can be attached to and detached from the vehicle connector 14 only by opening the lid 19 having a small size. This increases convenience.

Although the embodiment according to the present application has been described, various design changes may be made on the present application without departing from the gist of the present application.

For example, an electric vehicle to which the present application is applied is not limited to the fuel cell vehicle of the embodiment. The present application may be applied to an electric vehicle driven by power stored in an energy storage.

Furthermore, although the vehicle connector 14 is provided in the rear fender according to the embodiment, the position where the vehicle connector 14 is provided may be arbitrarily determined. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A connector attachment structure for an electric vehicle comprising:
    an attachment bracket secured to a vehicle body; and
    a vehicle connector attached to the attachment bracket and connected through a cable to a vehicle-mounted power switchboard,
    wherein the attachment bracket includes
        a first bracket having an attachment portion to which the vehicle connector is attached, and
        a second bracket secured to the vehicle body and positioned on a vehicle inner side of the first bracket,
    wherein the first bracket and the second bracket constitute a closed cross section,
    wherein the first bracket protrudes outward in a vehicle width direction to have a space between the first bracket and the second bracket, and
    wherein the closed cross section is a cross section taken along the vehicle width direction.

2. The structure according to claim 1,
    wherein an outer portion of the attachment bracket in the vehicle width direction is secured to a wheel house outer of the vehicle and an inner portion of the attachment bracket in the vehicle width direction is secured to a damper base of the vehicle.

3. The structure according to claim 2,
    wherein an outer lower end portion of the attachment bracket in the vehicle width direction is secured to the wheel house outer of the vehicle and an inner upper end portion of the attachment bracket in the vehicle width direction is secured to the damper base of the vehicle.

4. The structure according to claim 2,
    wherein the attachment portion is an opening into which the vehicle connector is fitted, and the first bracket includes a reinforcing bead at a position adjacent to the opening, and
    the bead is located between the opening and the outer portion or the inner portion of the attachment bracket.

5. The structure according to claim 1,
    wherein the attachment portion is an opening into which the vehicle connector is fitted, and the first bracket includes a reinforcing bead at a position adjacent to the opening.

6. A vehicle comprising the structure according to claim 1.

* * * * *